United States Patent [19]
Mok

[11] Patent Number: 6,016,169
[45] Date of Patent: Jan. 18, 2000

[54] ELECTRONICALLY PROGRAMMABLE FREQUENCY MODULATION CIRCUITS AND RELATED METHODS

[75] Inventor: Do-Sang Mok, Seoul, Rep. of Korea

[73] Assignee: Samsung Electronics Co., Ltd., Rep. of Korea

[21] Appl. No.: 08/753,941

[22] Filed: Dec. 2, 1996

[30] Foreign Application Priority Data

Nov. 30, 1995 [KR] Rep. of Korea .................. 95-45626

[51] Int. Cl.[7] ........................................ H04N 5/92
[52] U.S. Cl. ..................... 348/724; 327/113; 332/117
[58] Field of Search ......................... ; 332/117, 123, 332/124, 125, 126, 135, 183, 184; 331/23, 177 R, 179, 182; 327/101, 113; 348/724, 723; H04N 5/92, 5/40

[56] References Cited

U.S. PATENT DOCUMENTS 5,585,751 12/1996 Iizuka ...................................... 327/113

FOREIGN PATENT DOCUMENTS 59-22492 2/1984 Japan ...................................... 332/135

*Primary Examiner*—David E. Harvey
*Attorney, Agent, or Firm*—Myers Bigel Sibley & Sajovec

[57] ABSTRACT

A frequency modulation circuit which generates a frequency modulation signal responsive to a video input signal includes a programmable control circuit, an electrical flow control circuit, and an oscillation circuit. The programmable control circuit generates a plurality of electrical flow control signals responsive to an electronic data input. The electrical flow control circuit controls an electrical flow therethrough responsive to the plurality of electrical flow control signals. The oscillation circuits generates the frequency modulation signal responsive to the video input signal and responsive to the electrical flow through the electrical flow control circuit. Related methods are also disclosed.

15 Claims, 5 Drawing Sheets

ELECTRONICALLY PROGRAMMABLE FREQUENCY MODULATION CIRCUITS AND RELATED METHODS

FIELD OF THE INVENTION

The present invention relates to the field of electronics and more particularly to the field of frequency modulation electronics.

BACKGROUND OF THE INVENTION

When manufacturing integrated circuit devices, the electrical characteristics of a given type of device may vary even though each device is produced using the same manufacturing steps. Accordingly, the variations of these electrical characteristics from device to device should be maintained within a relatively small range to maintain the interchangeability thereof. In particular, integrated circuit devices which produce frequency modulation signals should have a relatively uniform carrier and deviation of the frequency modulation signal. Accordingly, the complexity of manufacturing methods used to produce such devices may be increased in order to maintain a uniformity of electrical characteristics.

When producing integrated circuit frequency modulation devices according to the national televideo system committee (NTSC) standard which defines video signals for video cassette recorders (VCR), the frequency modulation signal should have a carrier frequency of 3.4 Mhz±0.1 Mhz corresponding to a synchronization tip level of the input video signal. The deviation of the frequency modulation signal should have a frequency of 1.0 Mhz±0.1 Mhz corresponding to a white peak of a video input signal. More particularly, these standards are provided for the video home system (VHS).

FIG. 1 illustrates a circuit according to the prior art which generates a frequency modulation signal. This circuit includes a carrier control part 2, a deviation control part 3, and a voltage controlled oscillator 4. The carrier control part 2 receives a video input signal Vin having a synchronization signal as well as video input information. The carrier control part 2 generates a first voltage in response to the variable resistor VR1 which corresponds to a synchronization tip level for the video input signal. The deviation control part 3 generates a second voltage in response to the variable resistor VR2 which corresponds to a white peak of the video input of the video input signal. The voltage controlled oscillator 4 generates the frequency modulation signal FM wherein the carrier of the frequency modulation signal has a frequency of 3.4 Mhz±0.1 Mhz and a deviation of the frequency modulation signal has a frequency of 1.0 Mhz ±0.1 Mhz in response to the first and second voltages.

In order to ensure that the frequency modulation signal falls within the above-mentioned parameters, variable resistors VR1 and VR2 are provided at the periphery of the carrier control part 2 and the deviation control part 3. Accordingly, the frequency of the frequency modulation signal FM can be adjusted using the above-mentioned variable resistors. The adjustment of the variable resistors, however, may increase the time required to manufacture the video cassette recorder thus reducing the manufacturing costs thereof. This increased manufacturing time is due to the time required to manually adjust the variable resistors. Accordingly, there continues to exist a need in the art for improved frequency modulation circuits.

SUMMARY OF THE INVENTION

It is therefore an object of the present invention to provide improved frequency modulation circuits and methods.

It is another object of the present invention to provide electronically programmable frequency modulation circuits and methods.

These and other objects according to the present invention are provided by frequency modulation circuits including an electronically programmable control circuit, an electrical flow control circuit, and an oscillation circuit. The electronically programmable control circuit generates a plurality of electrical flow control signals responsive to an electronic data input. The electrical flow control circuit controls an electrical flow therethrough responsive to the plurality of electrical flow control signals. The oscillation circuit generates the frequency modulation signal responsive to a video input signal and responsive to the electrical flow through the electrical flow control circuit. This frequency modulation circuit can thus be electronically programmed by the manufacture without requiring manual adjustment when assembled in the next level product such as a video cassette recorder.

More particularly, the electrical flow control circuit may include a plurality of switches wherein each of the switches is responsive to one of the switch control signals so that each of the switches turns on or off responsive to the respective switching control signal. Accordingly, the electrical flow through the control circuit is proportional to the number of switches which are on. The programmable control circuit preferably includes a plurality of fuses wherein each of the fuses corresponds to one of the electrical flow control signals so that the plurality of fuses can be programmed responsive to the electronic data input. The programmable control circuit can thus be permanently programmed electronically. More particularly, a plurality of fuses can be programmed by melting at least one of the fuses responsive to the electronic data input. For example, each fuse can be formed from a line of metal or polysilicon which melts when a predetermined current is applied thereto. Each fuse thus corresponds to a respective electrical flow control signal so that the electrical flow control signal has either a high logic level or a low logic level depending on whether the fuse has been melted in two or remains intact.

The programmable control circuit preferably includes adjusting means for receiving a plurality of electronic data input and for generating different combinations of the switching control signals prior to programming the fuses. Accordingly, preferred operating conditions for the frequency modulation circuit can be determined prior to programming thereof.

An oscillation circuit can include an adjusting circuit which adjusts the video input signal responsive to the electrical flow through the electrical flow control circuit and a voltage controlled oscillator which generates the frequency modulation signal responsive to the adjusted video input signal. Furthermore, the plurality of switches can be divided into first and second groups with the first group of switches being connected in parallel and the second group of switches being connected in parallel. The adjusting circuit can then include a carrier control part and a deviation adjusting part connected in series wherein the carrier control part is responsive to the first group of switches and the deviation adjusting part is responsive to a second group of switches.

The frequency modulation circuit of the present invention can operate in one of an adjusting operation mode, a programming operation mode, and a normal operation mode responsive to information in the electronic data input. In the adjusting mode, the programmable control circuit generates the plurality of electrical flow control signals responsive to a data portion of the electronic data input. In the programming mode, the programmable control circuit programs the plurality of fuses in response to the data portion. In the normal mode, the programmable control circuit generates the plurality of electrical flow control signals responsive to the programmed fuses.

A method for generating a frequency modulation signal is provided according to an alternate aspect of the present invention. This method includes the steps of generating a plurality of electrical flow control signals responsive to an electronic data input, generating electrical flow in response to the plurality of electrical flow control signals, and generating the frequency modulation signal responsive to a video input signal and responsive to the electrical flow.

The circuits and methods of the present invention thus allow the frequency modulation circuit to be programmed electronically thus eliminating the need to perform manual adjustments. In particular, the circuits and methods can be used to provide a frequency modulation signal having a carrier frequency of 3.4 Mhz ±0.1 Mhz and a deviation frequency of 1.0 Mhz±0.1 Mhz.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
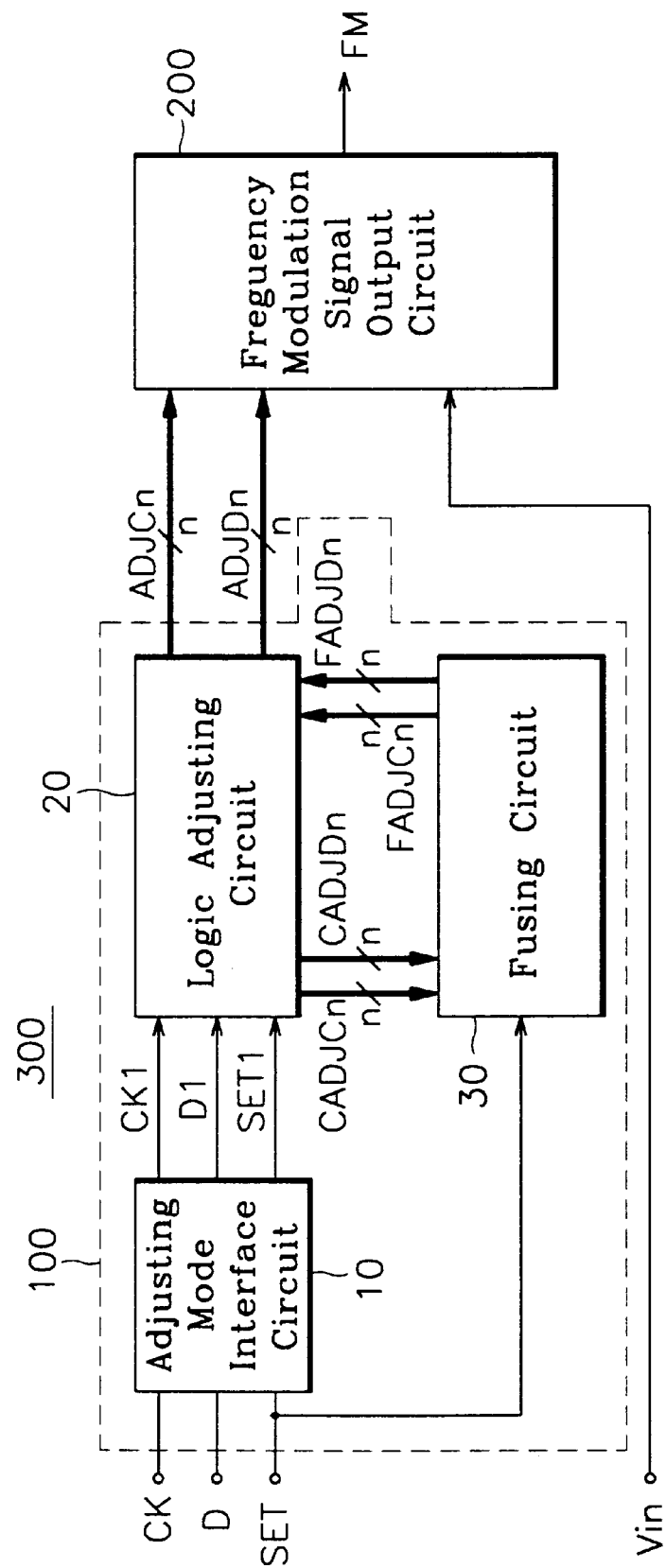
FIG. 2 is a block diagram illustrating a frequency modulation circuit including a fusing circuit according to the present invention.

FIG. 2 is a block diagram illustrating a circuit for generating a frequency modulation signal including a fusing circuit according to the present invention. The frequency modulation circuit 300 includes a fusing portion 100. The fusing portion has a plurality of fuse elements each of which can be fused by transmitting a predetermined current therethrough. The frequency modulation output circuit 200 receives a video input signal Vin having a synchronization signal and video input information. This frequency modulation output circuit generates the frequency modulation signal FM with the appropriate carrier frequency and deviation frequency corresponding to a synchronization tip level of the video input signal.

The fusing portion 100 receives a clock input signal CK which drives the fusing portion, and a serial data signal D which has both an address portion and a data portion. The fusing portion 100 receives a set signal SET for melting individual fuses, and generates a plurality of carrier switching control signals ADJC1–ADJCn and deviation switching control signals ADJD1–ADJDn. Each of these signals has a high or a low logic value according to the status of a corresponding fuse element.

The fusing portion 100 includes an adjusting mode interface circuit 10, a logic adjusting circuit 20, and a fusing circuit 30. The adjusting mode interface circuit 10 reduces input signal noise and generates an inner clock signal CK1, an inner serial data signal D1, and an inner set signal SET1. The inner set signal SET1 has a high level voltage sufficient to drive the fusing system when the clock signal CK, the serial data signal D, and the set signal SET are at low level voltages. The inner set signal SET1 has a voltage level insufficient to drive the fusing portion when the noises of the above-mentioned input signals prevent the fusing portion from operating.

The logic adjusting circuit 20 receives the above-mentioned output signals and generates a plurality of carrier fusing selection signals CADJC1–CADJCn and deviation fusing selection signals CADJD1–CADJDn in an adjusting mode. The adjusting mode can be used to determine a desired programming for the fusing circuit 30 which includes a plurality of fuse elements. The logic adjusting circuit 20 also generates a plurality of carrier fusing selection signals CADJC1–CADJCn and deviation fusing selection signals CADJD1–CADJDn in a fusing mode. These fusing selection signals thus determine which fuse elements of the fusing circuit 30 will be melted (or fused) to provide a desired operation of the frequency modulation signal output circuit 200 after determining which fuse elements to melt in the adjusting mode.

The fusing circuit 30 can be programmed by selectively melting fuse elements therein in response to the carrier fusing selection signals CADJC1–CADJCn and the deviation fusing selection signals CADJD1–CADJDn when in the fusing mode. Accordingly, the resulting carrier fusing consequence signals FADJC1–FADJCn and the deviation fusing consequence signals FADJD1–FADJDn have fixed data values determined by the programming of the fusing circuit 30. More particularly, each fuse element corresponds to a respective carrier fusing consequence signal or a respective deviation fusing consequence signal, and whether the fuse element has been melted or not determines the state of the corresponding fusing consequence signal when operating in the normal mode.

Figure 1:
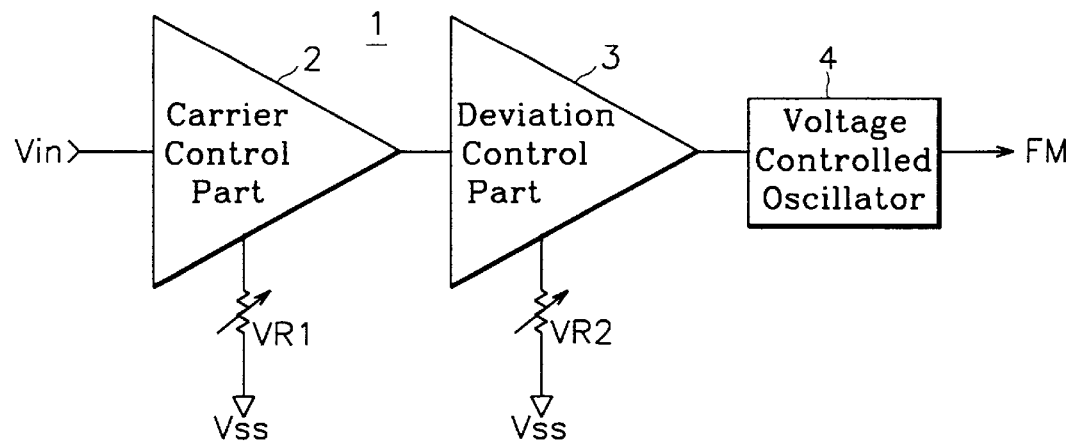
FIG. 1 illustrates a frequency modulation circuit according to the prior art.
Figure 3:
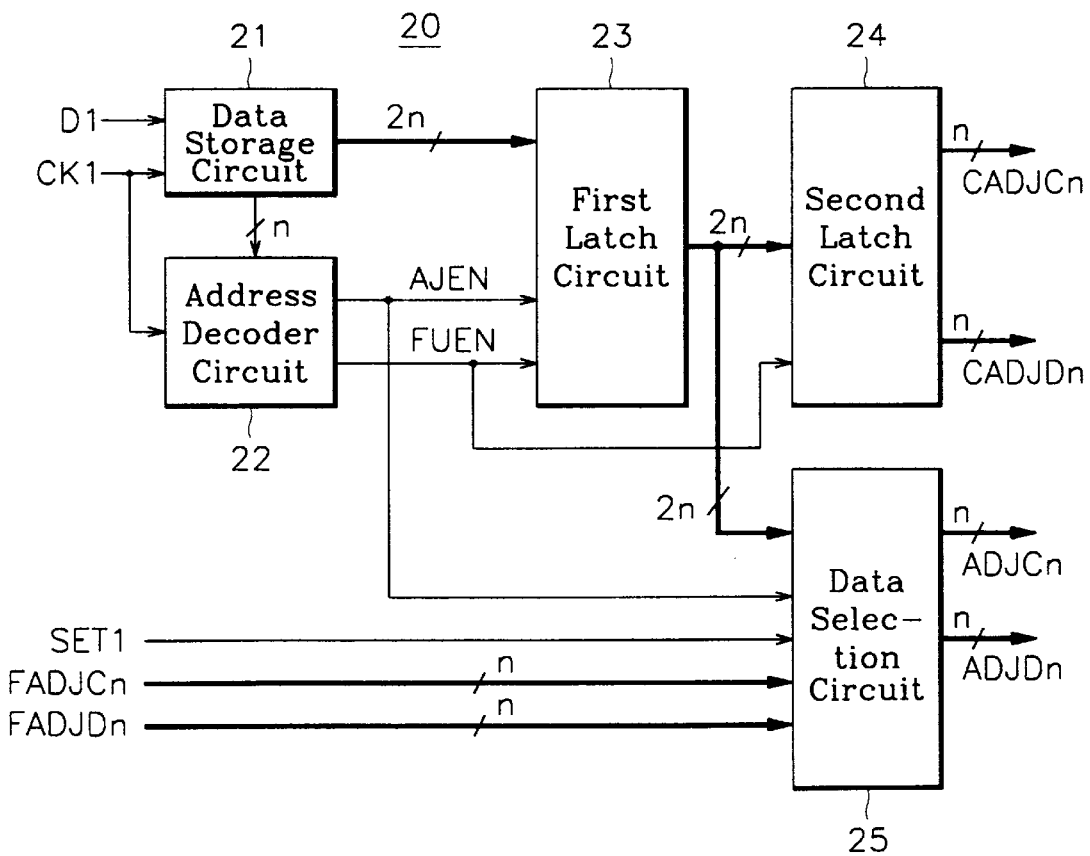
FIG. 3 is a block diagram illustrating a logic control circuit for the frequency modulation circuit of FIG. 2.

As shown in FIG. 3, the logic adjusting circuit 20 includes a data storage circuit 21, an address decoder circuit 22, a first latch circuit 23, a second latch circuit 24, and a data selection circuit 25. The data storage circuit 21 successfully receives the inner serial data signal D1 which includes address and data portions. The inner data signal D1 is serially received bit by bit using the inner clock signal CK1. The data is then output from the data storage circuit 21 in parallel.

The address decoder circuit 22 decodes the parallel address data received from the data storage circuit 21. In response, the adjusting mode enable signal AJEN and the fusing mode enable signal FUEN are generated thereby. The first latch circuit 23 receives the parallel data generated by the data storage circuit 21 and latches this data when either the adjusting mode enable signal AJEN or the fusing mode enable signal FUEN is activated.

The second latch circuit 24 is enabled when the fusing mode enable signal FUEN is driven to a high level state. When enabled, the second latch circuit 24 receives and latches the data stored in the first latch circuit 23. The second latch circuit 24 also generates the plurality of carrier fusing selection signals CADJC1–CADJCn and the plurality of deviation fusing selection signals CADJD1–CADJDn.

The data selection circuit 25 selects the data stored in the first latch circuit 23 when the adjusting mode enable signal AJEN and the inner set signal SET1 are both activated. The data selection circuit 25 selects the carrier fusing consequence signals FADJC1–FADJCn and the deviation fusing consequence signals FADJD1–FADJDn when the inner set signal SET1 is not activated. When the carrier fusing consequence signals and deviation fusing consequence signals are selected, the data selection circuit 25 respectively passes these signals through as the carrier switching control signals ADJC1–ADJCn and the controlled switching control signals ADJD1–ADJDn.

Figure 4:
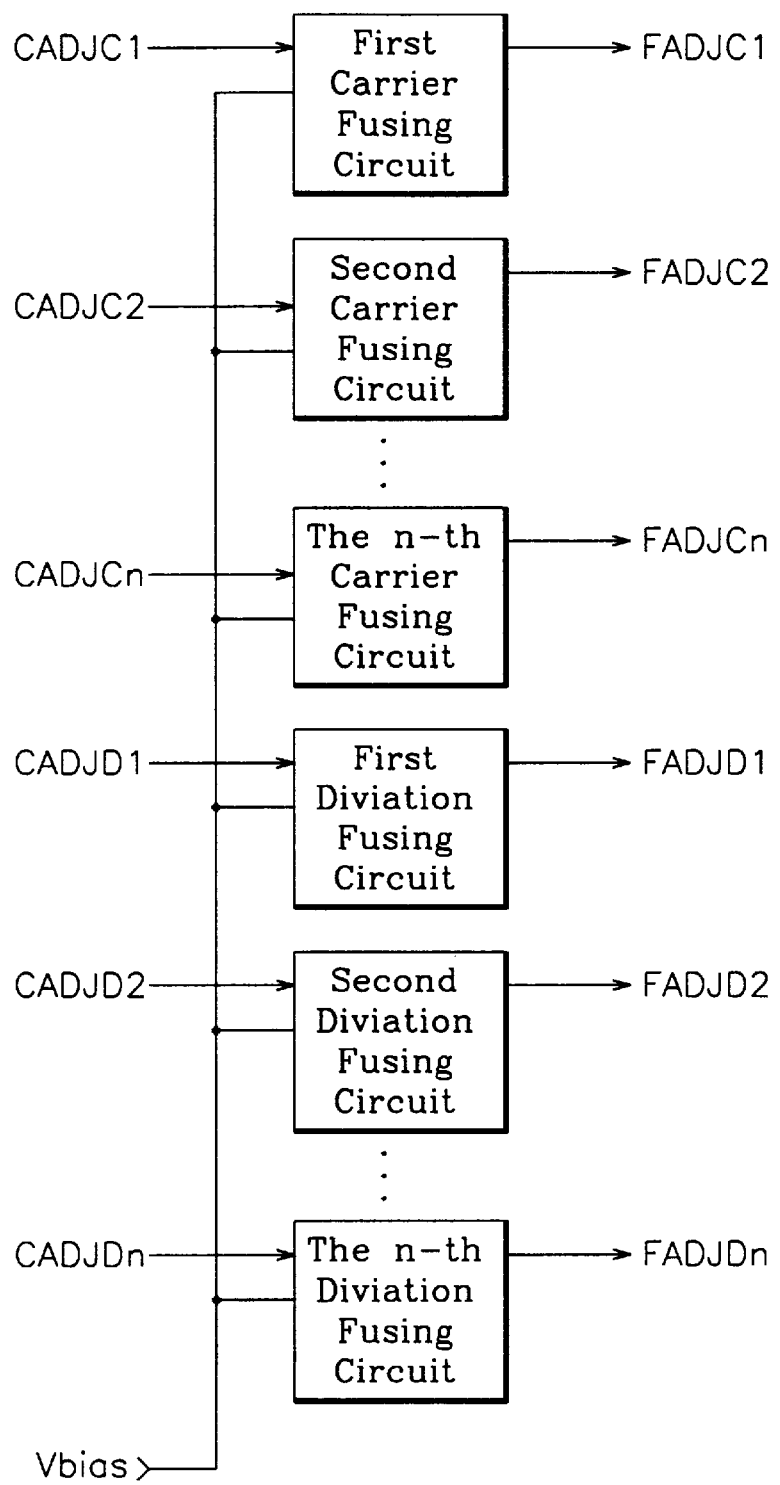
FIG. 4 is a block diagram illustrating fusing circuits for the frequency modulation circuit of FIG. 2.
Figure 5:
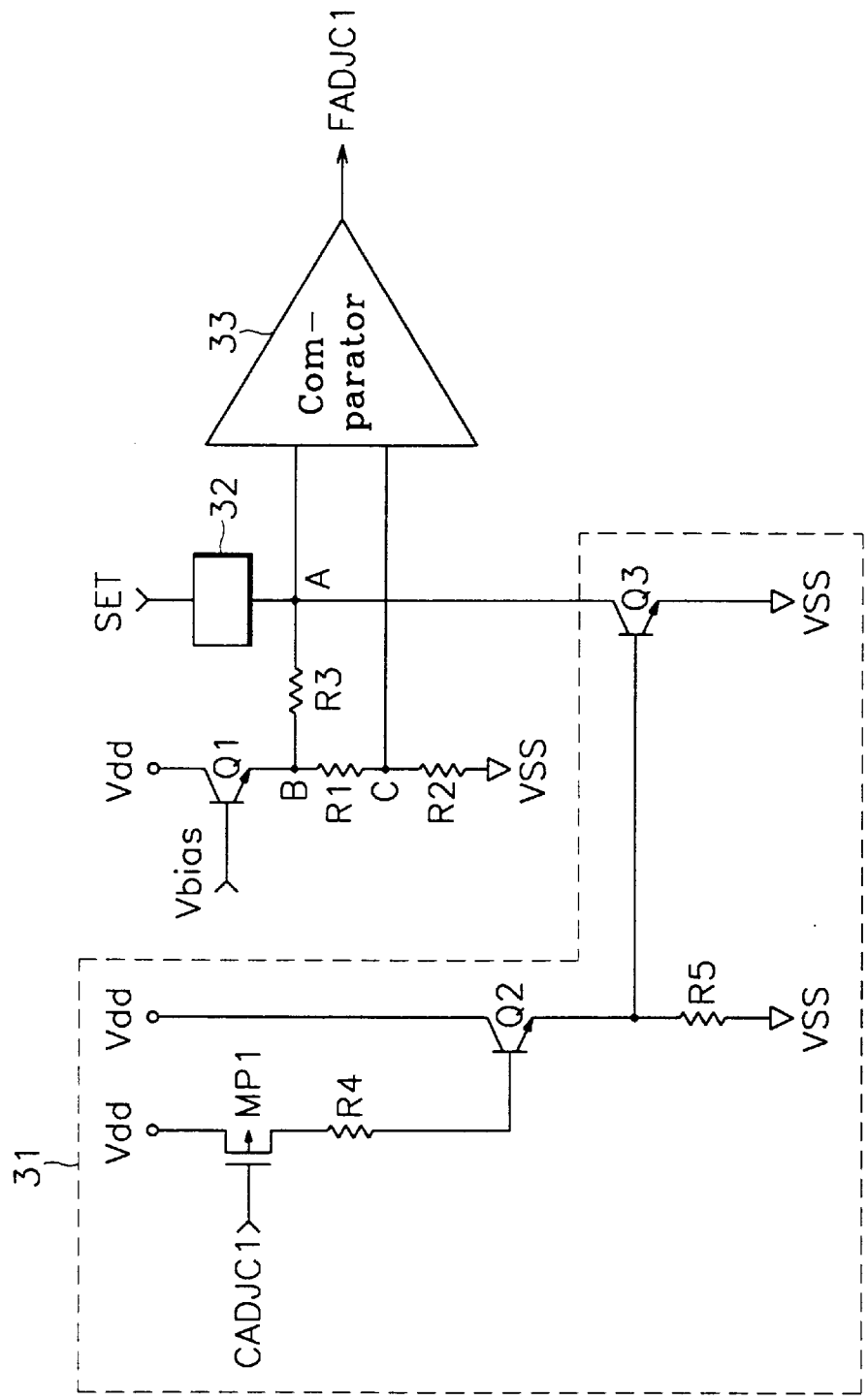
FIG. 5 is a schematic diagram for an individual fusing circuit of FIG. 4.

FIG. 4 is a block diagram illustrating the fusing circuit 30 of FIG. 2. More particularly, FIG. 5 is a schematic diagram illustrating a first carrier fusing circuit of FIG. 4. The first carrier fusing circuit of FIG. 5 includes a fusing element 32, a fusing enable circuit 31, a bipolar transistor Q1, a first resistor R1, a second resistor R2, a third resistor R3, and a comparator 33. The fusing element 32 is connected between a set signal SET and a first node A. The fusing enable circuit 31 determines whether or not the fuse element 32 is melted (or fused). This determination is made according to the corresponding carrier fusing selection signal CADJC1–CADJCn or deviation fusing selection signal CADJD1–CADJDn which is generated by the logic adjusting circuit 20 of FIG. 2. More particularly, a fuse element can be a narrow portion of metal or polysilicon which melts when a predetermined current is applied thereto.

The first bipolar transistor Q1 has a collector connected to the power supply Vdd, a base connected to a first bias voltage Vbias1, and an emitter connected to a second node B. The first resistor R1 is connected between the second node B and a third node C. The second resistor R2 is connected between the ground Vss and the third node C. The third resistor R3 is connected between the first node A and the second node B. The first comparator 33 generates either a carrier fusing consequence signal FADJC1–FADJCn or a deviation fusing consequence signal FADJD1–FADJDn having a high or low logic value according to the voltages generated at the first node A and the third node C.

The fusing enable device 31 includes a first PMOS transistor MP1, a second bipolar transistor Q2, a third bipolar transistor Q3, and resistors R4 and R5. The first PMOS transistor MP1 turns off when the corresponding fusing selection signal CADJC1–CADJCn or deviation fusing selection signal CADJD1–CADJDn has a high logic value. This first PMOS transistor turns on when the associated signal has a low logic value. The second bipolar transistor Q2 turns off when a first PMOS transistor MP1 turns off and turns on when the first PMOS transistor MP1 turns on. The third bipolar transistor Q3 turns off when the second bipolar transistor Q2 turns off and is saturated when the second bipolar transistor Q2 turns on.

The first PMOS transistor MP1 includes a source connected to the power supply Vdd, a gate connected to a corresponding carrier fusing selection signal CADJC1–CADJCn or deviation fusing selection signal CADJD1–CADJDn, and a drain connected to the fourth resistor R4. The second bipolar transistor Q2 includes a base connected to a second terminal of the fourth resistor R4, a collector connected to the power supply Vdd, and an emitter connected to a first terminal of the fifth resistor R5. The second terminal of the fifth resistor R5 is connected to ground. The third bipolar transistor Q3 includes a collector connected to a first node A, an emitter connected to ground Vss, and a base connected to the emitter of the second bipolar transistor.

Figure 6:
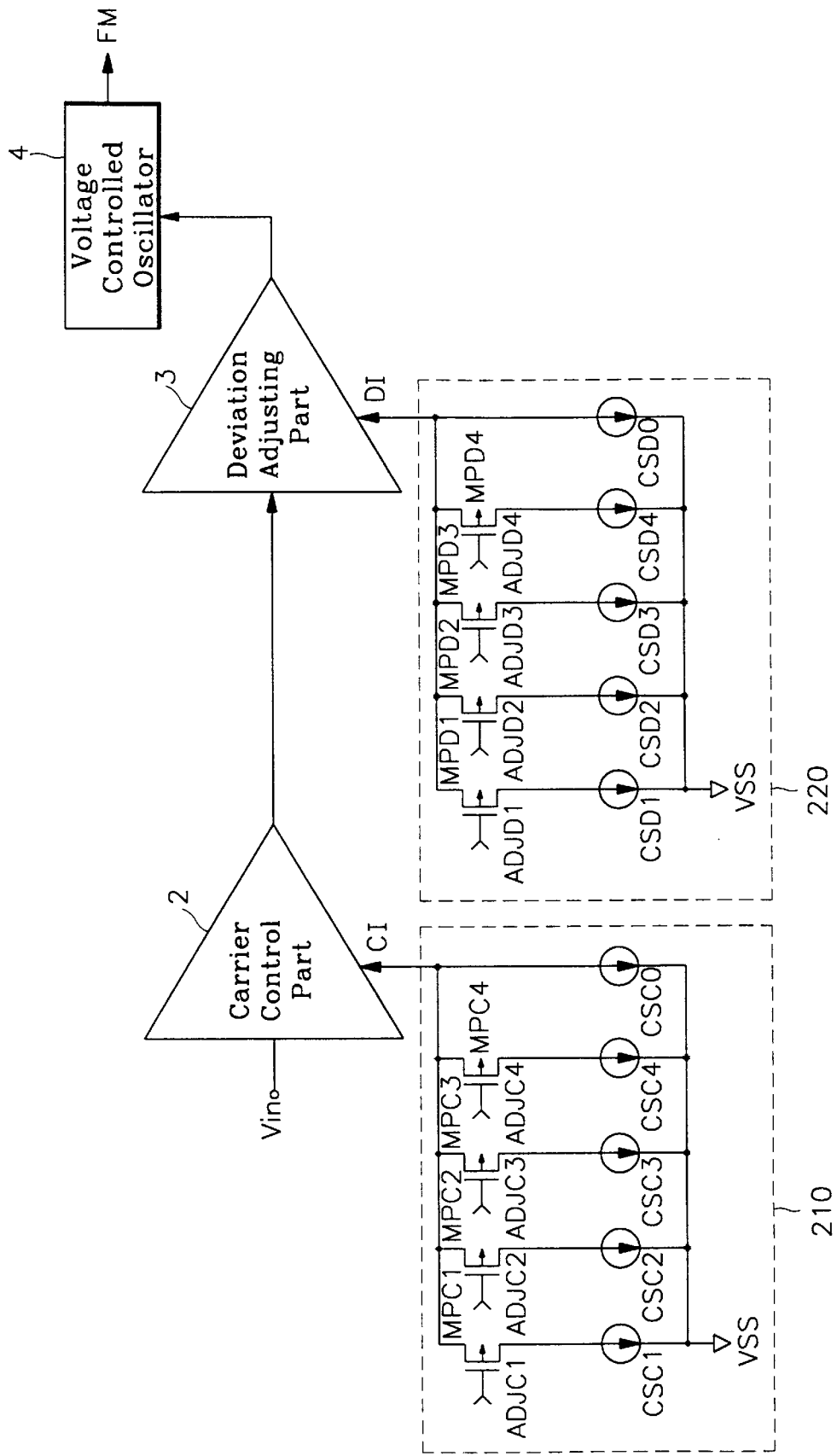
FIG. 6 is a block diagram illustrating a frequency modulation output circuit of FIG. 2.

FIG. 6 is a schematic diagram illustrating the frequency modulation signal output circuit 200 of FIG. 2. This output circuit includes a carrier current circuit 210, a deviation current circuit 220, a carrier control part 2, a deviation adjusting part 3, and a voltage controlled oscillator 4. The carrier current circuit 210 provides a variable current according to the logic values of the plurality of carrier switching control signals ADJC1–ADJCn generated by the logic adjusting circuit 20. This variable current CI is drawn from the carrier control part 2. The deviation current circuit 220 provides a variable current according to the logic values of the plurality of deviation switching control signals ADJD1–ADJDn generated by the logic adjusting circuit 20. This variable deviation current DI is drawn from the deviation adjusting part 3.

The carrier control part 2 receives the video input signal Vin having a synchronization signal and a video input information signal. The carrier control part 2 generates a first voltage responsive to the video input signal Vin and the variable carrier current CI. This first voltage corresponds to the synchronization tip level of the video input signal Vin. The deviation adjusting portion 3 generates a second voltage responsive to the first voltage and responsive to the variable deviation current DI corresponding to a white peak of the video input signal.

The voltage controlled oscillator 4 generates the frequency modulation signal FM wherein the carrier of the frequency of the modulation signal has a frequency of 3.4 Mhz±0.1 Mhz, and the deviation of the frequency signal has a frequency of 1.0 Mhz±0.1 Mhz responsive to the first and second voltages of the carrier control part 2 and the deviation adjusting part 3.

The carrier current circuit 210 includes a plurality of carrier current sources CSC0–CSCn and PMOS transistors MPC1–MPCn. The sources of each of these PMOS transistors are connected to respective carrier current sources with the exception that the first carrier current source CSC0 is connected directly to the carrier control part 2. The gates of each of the PMOS transistors are connected to respective carrier switching control signals ADJC1–ADJCn generated by the logic adjusting circuit 20. The drains of the PMOS transistors are connected to a common terminal which is in turn connected to the carrier control part 2.

The deviation current circuit 220 includes a plurality of deviation current sources CSD0–CSDn and a respective plurality of PMOS transistors MPD1–MPDn. The sources of each of these PMOS transistors are connected to respective deviation current sources with the exception that the deviation current source CSD0 is connected directly to the deviation adjusting part 3. Each of these PMOS transistors includes a gate connected to a respective deviation switching control signal ADJD1–ADJDn. Each of these PMOS transistors also includes a drain connected to a common terminal which is in turn connected to the deviation adjusting part 3.

The operation of the structure described above will now be discussed below with reference to FIGS. 2–6. In particular, the frequency modulation circuit of the present invention can operate in an adjusting mode, a fusing mode, and a normal mode. The adjusting mode is used to determine the input data required to generate a frequency modulation signal having a carrier frequency of 3.4 Mhz±0.1 Mhz and a deviation frequency of 1.0 Mhz±0.1 Mhz. Accordingly, the synchronization tip level of the video input signal can be converted to 3.4 Mhz and the white peak of the video input signal can be converted to 4.4 Mhz when the video input signal is 0.5Vpp. The desired carrier switching control signals and deviation switching control signals can thus be determined prior to melting (or fusing) any of the fuse elements of the fusing circuit 30. In other words, various combinations of carrier switching control signals and deviation switching control signals can be tried before programming the frequency modulation circuit.

In the fusing mode, the desired carrier switching control signals and deviation switching control signals are programmed into the frequency modulation circuit. The desired signals can be determined as discussed above in the adjusting mode, and then fuse elements in the fusing circuit can be melted (or fused) to generate the desired output signals.

In the normal mode, the frequency modulation circuit is programmed to produce the desired carrier switching control signals and deviation switching control signals to produce a frequency modulation signal having the desired frequency. Because the frequency modulation circuit has been programmed by melting (or fusing) predetermined fuse elements of the fusing circuit, the carrier switching control signals and the deviation switching control signals remain constant.

A set signal SET is an input signal for the adjusting mode interface circuit 10, and this signal is driven to a high logic value when the frequency modulation circuit is operating in the adjusting mode or the fusing mode. This set signal SET is driven to the low logic value when operating the frequency modulation circuit in the normal mode. When a clock signal CK, a serial data signal D including an address and data transmitted serially, and the set signal SET are low, voltage levels or noise of the above-mentioned signals may prevent driving the logic adjusting circuit 20. Accordingly, the adjusting mode interface circuit 10 generates the inner clock signal CK1, the inner serial data signal D1, and the inner set signal SET. If the clock signal CK, the serial data signal D1, and the set signal SET have voltage levels sufficient to drive the logic adjusting circuit 20 with sufficiently low noise levels, the adjusting mode interface circuit 10 may not be required.

The logic adjusting circuit 20 of FIG. 3 operates as follows. The data storage circuit 21 successively receives the inner serial data signal D1 which includes both address and data portions. This inner data signal is received bit by bit according to the inner clock signal CK1, and upon receipt, the data is output from the data storage circuit in parallel. The address portion is output by the data storage circuit 21 and provided to the address decoder circuit 22. The address decoder circuit 22 generates the adjusting mode enable signal AJEN and the fusing mode enable signal FUEN after receiving the address which is generated in parallel by the data storage circuit. In addition, the parallel data output from the data storage circuit is provided to the first latch circuit 23 responsive to the enable signals.

When the address indicates operation in the adjusting mode, the address decoder circuit 22 activates the adjusting mode enable signal AJEN and deactivates the fusing mode enable signal FUEN. The first latch circuit 23 is enabled thus latching the parallel data provided by the data storage circuit 21. The second latch circuit 24 is disabled, and this second latch circuit outputs carrier fusing selection signals CADJC1–CADJCn and deviation fusing selection signals CADJD1–CADJDn having high logic values.

In the adjusting mode, the data selection circuit 25 selects the data which is latched in the first latching circuit 23 in response to the activated adjusting mode enable signal AJEN and inner set signal SET1. The data selection circuit 25 thus generates carrier switching control signals ADJC1–ADJCn and deviation switching control signals ADJD1–ADJDn responsive to the data from the first latch circuit 23. In other words, when the frequency modulation circuit is in an adjusting mode, the carrier switching control signals and the deviation switching control signals are generated responsive to the data provided in the serial data string D.

Operation in the fusing mode is discussed as follows. In the fusing mode, the adjusting enable signal AJEN is inactivated and the fusing mode enable signal FUEN is activated. In response, the first latch circuit 23 and the second latch circuit 24 are enabled, and the second latch circuit 24 generates the carrier fusing selection signals CADJC1–CADJCn and the deviation fusing selection signals CADJD1–CADJDn which determine the fusing elements to be melted or fused.

In the normal mode of operation, the inner set signal SET1 has a low logic value. In the normal mode, the data selection circuit 25 selects carrier fusing consequence signals FADJC1–FADJCn and deviation fusing consequence signals FADJD1–FADJDn generated by the fusing circuit 30 and outputs the carrier fusing consequence signals as the carrier switching control signals ADJC1–ADJCn and outputs the deviation fusing consequence signals as the controlled switching control signals ADJD1–ADJDn.

The operations of the fusing circuit illustrated in FIGS. 4 and 5 and the frequency modulation signal output circuit of FIG. 6 are discussed as follows. Because the carrier fusing selection signals CADJC1–CADJCn and the deviation fusing selection signals CADJD1–CADJDn have high logic values in the adjusting mode, the PMOS transistor MP1 of the fusing enable circuit 31 turns off. Accordingly, the second bipolar transistor Q2 and the third bipolar transistor Q3 both turn off and the fuse elements of the fusing circuits 30 are not melted (or fused). As discussed above, the carrier switching control signals ADJC1–ADJCn and the deviation switching control signals ADJD1–ADJDn are generated responsive to the serial data signal D when the frequency modulation circuit is in the adjusting mode, the PMOS transistors MPC1–MPCn and MPD1–MPDn of the carrier current circuit 210 and the deviation current circuit 220 turn on or off according to the data of the serial data signal.

For example, if each current source from the plurality of carrier current sources and deviation current sources can transmit 100 $\mu$A, and all of the serial data signals D have high logic values, the carrier variable current CI and the deviation variable current DI are 100 $\mu$A. Even though all of the PMOS transistors are off, the 100 $\mu$A flows through the current source CSC0 which is connected directly to the carrier control part 2. Each of the PMOS transistors MPC1–MPCn and MPD1–MPDn turn off responsive to the high logic level applied to the gates thereof. If only one of the carrier switching control signals ADJC1–ADJCn has a low logic value responsive to the serial data signal, the variable carrier current CI will be 200 $\mu$A because only one of the PMOS transistors MPC1–MPCn will turn on. Similarly, if only one of the deviation switching control signals ADJD1–ADJDn has a low logic value responsive to the serial data signal D, the variable deviation current DI will be 200 $\mu$A because only one of the PMOS transistors MPD1–MPDn will turn on.

Because the data of the carrier switching control signals and the deviation switching control signals both change according to the data of the serial data signal which can be changed continuously in the adjusting mode, the variable carrier current CI and the variable deviation current DI can be varied by turning the switching devices of the current circuits 210 and 220 on and off. Accordingly, the outputs of the carrier current control part 2 and the deviation adjusting part 3 can be varied to determine the most appropriate input data to generate a frequency modulation signal having the desired characteristics. In other words, the input data signal can be varied thus varying the numbers of switching devices which are on and off in the current circuits 210 and 220 thus varying the operation of the carrier control and deviation adjusting parts to ultimately vary the output frequency modulation signal. By monitoring the frequency modulation signal, a preferred status of the current circuits 210 and 220 can be determined. In particular, it can be determined how many switches to turn on and off in the current circuits 210 and 220 to produce a frequency modulation signal having a carrier frequency of 3.4 Mhz±0.1 Mhz and a deviation frequency of 1.0 Mhz±0.1 Mhz.

When the address indicating operation in the fusing mode is provided to the address decoder circuit 22, the data determined to provide the most appropriate frequency modulation signal is provided in the serial data signal D. A plurality of carrier fusing selection signals and deviation fusing selection signals are then generated by the logic adjusting circuit 20 responsive to the serial data signal D. The fusing circuit 30 of FIG. 4 thus melts (or fuses) the fuse element 32 if the corresponding carrier fusing selection signal or deviation fusing selection signal has a low logic level responsive to the data input signal.

For example, if the first carrier fusing selection signal CADJC1 has a high logic value the fuse element 32 is not melted (or fused) because the PMOS transistor MP1 turns off, and the second and third bipolar transistors Q2 and Q3 also turn off. If a first carrier fusing selection signal CADJC1 has a low logic value, the fuse element 32 is melted (or fused) because the PMOS transistor MP1 turns on and the second and third bipolar transistors Q2 and Q3 turn on in response thereto. In particular, the third bipolar transistor Q3 is saturated and power from the power supply Vdd is provided to the set signal SET in the fusing mode. Accordingly, the frequency modulation circuit is programmed in the fusing mode by melting (or fusing) one or more fusing elements in response to the data input signal, and the optimum values for the data input signal can be previously determined in the adjusting mode.

In the normal mode, the frequency modulation circuit generates the frequency modulation signal using the settings programmed during the fusing mode. Accordingly, the frequency modulation circuit can be programmed electronically before manufacturing the video cassette recorder. When operating in the normal mode, further melting (or fusing) of fuse elements is prevented because the set signal SET is connected to ground and thus has a low logic value. The programmable frequency modulation circuit can thus be electronically programmed and then assembled in a video cassette recorder.

As shown in FIG. 5, the first carrier fusing consequence signal FADJC1 is generated by the comparator 33 and has a low logic value when the voltage of the first node A is greater than the voltage of the third node C which occurs when the fuse element 32 has been melted (or fused). The first carrier fusing consequent signal FDJC1 has a high logic value when the first node A has a relatively low logic value as occurs when the fuse element 32 has not been melted (or fused) and the first node A is thus connected directly to the SET signal which has a low logic value in the normal operating mode. Accordingly, the first node A has a lower voltage than the third node C when the fuse element has not been melted (or fused).

The frequency modulation circuit of the present invention can thus be electronically programmed so that the carrier control part 2 and the deviation control part 3 respectively generate first and second voltages to generate the frequency modulation signal FM with a carrier frequency of 3.4 Mhz±0.1 Mhz corresponding to the synchronization tip level of the video input signal and a deviation frequency of 1.0 Mhz ±0.1 Mhz corresponding to a white peak of the video input of the video input signal. In particular, the frequency modulation circuit can be manufactured and then the fusing circuit 30 can be programmed by melting (or fusing) elements therein responsive to an electronic data signal. Furthermore, the frequency modulation circuit can be operated in an adjusting mode to determine a most desirable operating condition prior to programming the fusing circuit. The programmed frequency modulation circuit can then be assembled in a video cassette recorder to perform the frequency modulation function.

The circuits and methods of the present invention thus allow the electronic programming of the frequency modulation circuit. Accordingly, no manual adjustment is required. This programmable frequency modulation circuit thus allows precise adjustment thereof while reducing manufacturing costs and time.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A programmable frequency modulation circuit responsive to a video input signal, said frequency modulation circuit comprising:

a programmable control circuit which generates a plurality of sets of control signals in response to a set of test data and mode selection signals, said plurality of sets of control signals comprising switching control signals and fusing selection signals;

a fusing circuit operatively connected to said programmable control circuit which generates a plurality of fusing signals in response to said mode selection signals and said fusing selection signals;

a data selection circuit operatively connected to said programmable control circuit and said fusing circuit being responsive to said mode selection signals wherein said data selection circuit selects and outputs said test data in accordance with said switching control signals during an adjusting mode, and wherein said data selection circuit selects and outputs said fusing signals during a fusing mode in accordance with said switching control signals; and a frequency modulation signal output circuit connected to said data selection circuit which generates said frequency modulation signal in response to said switching control signals.

2. A programmable frequency modulation circuit according to claim 1 wherein said frequency modulation signal output circuit includes a plurality of switches and wherein each of said switches is responsive to one of said switching control signals so that each of said switches turns on or off responsive to said respective switching control signal.

3. A programmable frequency modulation circuit according to claim 2 wherein said programmable control circuit comprises a plurality of fuses and wherein each of said fuses corresponds to one of said electrical flow control signals so that said plurality of fuses can be programmed responsive to said electronic data input.

4. A programmable frequency modulation circuit according to claim 3 wherein said plurality of fuses are programmed by melting at least one of said fuses responsive to said electronic data input.

5. A programmable frequency modulation circuit according to claim 3 wherein said programmable control circuit includes adjusting means for receiving a plurality of electronic data inputs and for generating different combinations of said switching control signals prior to programming said fuses.

6. A programmable frequency modulation circuit according to claim 2 wherein said oscillation circuit comprises:

an adjusting circuit which adjusts said video input signal responsive to said electrical flow through said electrical flow control circuit; and a voltage controlled oscillator which generates said frequency modulation signal responsive to said adjusted video input signal.

7. A programmable frequency modulation circuit according to claim 6:

wherein said plurality of switches are divided into first and second groups with said first group of switches being connected in parallel and with said second group of switches being connected in parallel separate from said first group of switches; and wherein said adjusting circuit includes a carrier control part and a deviation adjusting part connected in series and wherein said carrier control part is responsive to said first group of switches and said deviation adjusting part is responsive to said second group of switches.

8. A programmable frequency modulation circuit according to claim 3:

wherein said electronic data input includes a data portion corresponding to said switching control signals and an address portion which selects one of an adjusting operation mode, a programming operation mode, and a normal operation mode;

wherein said programmable control circuit generates said plurality of electrical flow control signals responsive to said data portion in said adjusting mode;

wherein said programmable control circuit programs said plurality of fuses in response to said data portion in said programming mode; and wherein said programmable control circuit generates said plurality of electrical flow control signals responsive to said programmed fuses in said normal mode.

9. A method for generating a frequency modulation signal having a desired characteristic, said method comprising the steps of:

generating sets of control signals in response to sets of test data and mode selection signals wherein said sets of control signals comprise switching control signals and fusing selection signals;

selecting one of the test data in accordance with the switching signals during an adjusting mode and selecting the fusing selection signals in accordance with the switching control signals during a fusing mode; and generating said frequency modulation signal in response to a video input signal and said switching control signals.

10. A method according to claim 9 wherein each of said electrical flow control signals corresponds to a respective switch, and wherein said step of generating said electrical flow comprises turning each of said respective switches on and off responsive to said respective electrical flow control signals.

11. A method according to claim 10 wherein said step of generating said plurality of electrical flow control signals comprises programming a plurality of fuses responsive to said electronic data input.

12. A method according to claim 11 wherein said step of programming said plurality of fuses comprises melting at least one of said fuses responsive to said electronic data input.

13. A method according to claim 11 wherein said programming step is preceded by the steps of receiving a plurality of electronic data inputs and generating different combinations of said switching control signals.

14. A method according to claim 10 wherein said step of generating said frequency modulation signal comprises the steps of:

adjusting said video input signal responsive to said electrical flow; and generating said frequency modulation signal responsive to said adjusted video input signal.

15. A method according to claim 11 wherein said electronic data input includes a data portion corresponding to said switching control signals and an address portion which selects one of an adjusting operation mode, a programming operation mode, and a normal operation mode, and wherein said step of generating said plurality of electrical flow control signals comprises the steps of:

generating said plurality of electrical flow control signals responsive to said data portion in said adjusting mode;

programming said plurality of fuses in response to said data portion in said programming mode; and generating said plurality of electrical flow control signals responsive to said programmed fuses in said normal mode.

* * * * *